United States Patent [19]

Tanaka et al.

[11] Patent Number: 4,791,506
[45] Date of Patent: Dec. 13, 1988

[54] TAPE RECORDER WITH STOP DETECTING MECHANISM

[75] Inventors: Shinsaku Tanaka, Tokyo; Tadao Arata, Inagi; Kunio Kido, Wako, all of Japan

[73] Assignee: Tanashin Denki Co., Ltd., Japan

[21] Appl. No.: 943,742

[22] Filed: Dec. 19, 1986

[30] Foreign Application Priority Data

Jul. 14, 1986 [JP] Japan ............................. 61-107602[U]

[51] Int. Cl.⁴ .............................................. G11B 15/48
[52] U.S. Cl. .................................................... 360/74.2
[58] Field of Search ................ 360/74.2; 242/186, 191

[56] References Cited

U.S. PATENT DOCUMENTS 4,491,883 1/1985 Suzuki ............................... 360/74.2

Primary Examiner—A. J. Heinz
Attorney, Agent, or Firm—Wegner & Bretschneider

[57] ABSTRACT

A tape recorder wherein stopping of a reel receiving member in a reproduction or recording operating mode of the tape recorder is detected assuredly to activate a particular mechanism of the tape recorder such as an automatic stopping mechanism or an automatic reversing mechanism without a high contacting pressure of a pinch roller to a capstan while assuring a high stability of running of a tape. The tape recorder comprises a detecting member frictionally engaged with the reel receiving member so that while the reel receiving member is rotating, the detecting member produces an urging force in a direction. When the tape recorder is in a reproduction or recording operating mode, the urging force moves an operating member away from a locus of an engaging portion of a rotary member connected to the reel receiving member, but upon stopping of the reel receiving member, the urging force disappears so that the engaging portion will be engaged with and move the operating member thereby to activate such a particular mechanism. But when the tape recorder is in any other operating mode, the operating member is held away from the locus of the engaging portion of the rotary member.

8 Claims, 3 Drawing Sheets

FIG. 6
FIG. 7
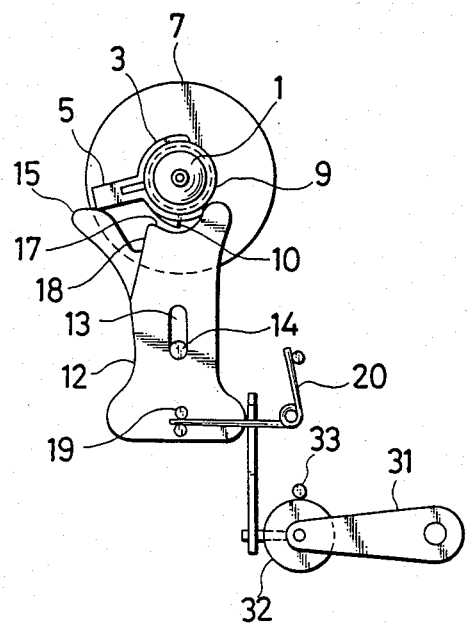
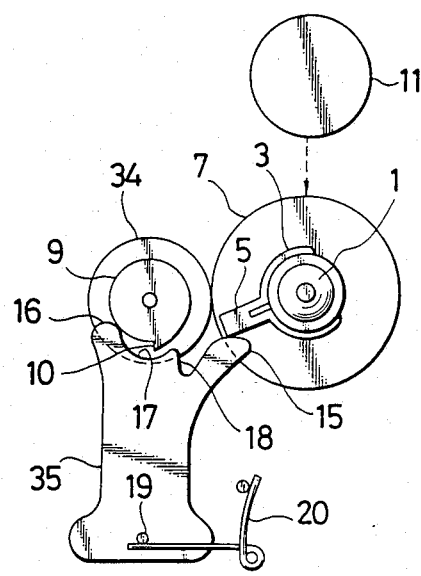
FIG. 8
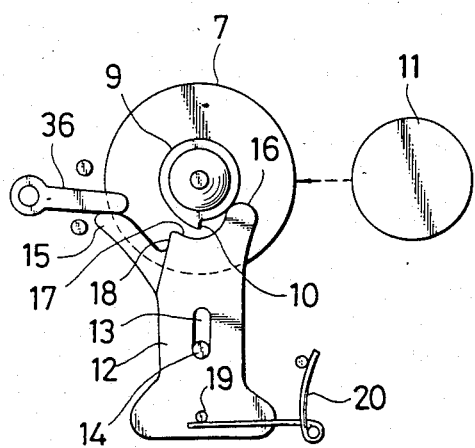
FIG. 9
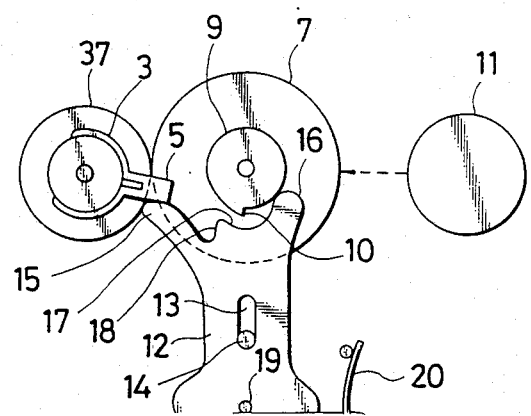

TAPE RECORDER WITH STOP DETECTING MECHANISM

BACKGROUND OF THE INVENTION

1. Field of the Invention

This invention relates to a tape recorder of the type wherein stopping of a reel receiving member is detected to activate a particular mechanism of the tape recorder such as an automatic stopping mechanism or an automatic reversing mechanism.

2. Description of the Prior Art

Tape recorders are already known wherein when a reel receiving member is stopped, for example, at an end of a tape, an automatic stopping mechanism, an automatic reversing mechanism or some other mechanism is activated.

In a conventional tape recorder of the type described, a tape tension detecting member is mounted on a head carrying member on which a magnetic head is carried, and in a reproduction or recording operating mode of the tape recorder, the tape tension detecting member is pressed against a magnetic tape at a position near the magnetic head so that the tape travels along a partially bent or curved path.

Accordingly, when the tape comes to its end in the reproduction or recording operating mode of the tape recorder, the tension of the tape will increase suddenly and thus attempt to straighten the partially bent or curved portion of the tape. This will push the detecting member to move back to its home position. Such movement of the detecting member then is thus used to activate a particular mechanism of the tape recorder such as an automatic stopping mechanism or an automatic reversing mechanism.

Since in a reproduction or recording operating mode of the tape recorder the tape tension detecting member is pressed against a magnetic tape so that the tape runs along a partially bent or curved path in this manner, the conventional tape recorders have following problems:

(1) Since a magnetic tape is pressed by the detecting member, the resistance to the tape during running is high. Consequently, the contacting pressure of a pinch roller to a capstan must be high accordingly, and hence a spring is necessitated which provides such a high contacting pressure. As a result, the capstan undergoes a high lateral pressure, which makes designing of a bearing difficult. Besides, a high operating force is required for reproduction or recording operation.

(2) Since a tape runs along a partially bent or curved path, running of the tape is unstable, which is particularly remarkable at a joint of tapes.

SUMMARY OF THE INVENTION

It is an object of the present invention to provide a tape recorder wherein stopping of a reel receiving member in a reproduction or recording operating mode of the tape recorder is detected assuredly to activate a particular mechanism of the tape recorder such as an automatic stopping mechanism or an automatic reversing mechanism without a high contacting pressure of a pinch roller to a capstan while assuring a high stability of running of a tape.

In order to attain the object, according to the present invention, there is provided a tape recorder of the type which includes a reel receiving member, a rotary member connected to be driven to rotate by a motor by way of frictional motion transmitting means and having an engaging portion thereon, a detecting member normally held in contact with said reel receiving member or a rotatable member which is rotated and stopped in synchronism with said reel receiving member such that said detecting member may be urged in a predetermined direction by an urging force caused by a turning force of said reel receiving member or said rotatable member, and an operating member located near said rotary member and having an engaging portion thereon, whereby while said reel receiving member is rotating, said operating member is continuously urged in a predetermined direction by the urging force produced at said detecting member thereby to prevent engagement between said engaging portion of said rotary member and said engaging portion of said operating member, but when the urging force of said detecting member disappears, said engaging portion of said rotary member is engaged with said engaging portion of said operating member to operate said operating member thereby to activate a particular mechanism of said tape recorder, wherein said rotary member further has a cam face extending around the center of rotation thereof and having an end contiguous to said engaging portion thereof while said operating member further has an abutting portion for abutting engagement with said cam face of said rotary member, and a slidably contacting face contiguous to said abutting portion thereof and located such that when said engaging portion of said rotary member is slidably contacted with said slidably contacting face of said operating member, said engaging portion of said operating member is positioned on a locus of rotation of said engaging portion of said rotary member, and wherein said operating member is associated with a movable member which has different positions for a reproduction or recording operating mode and for any other operating mode of said tape recorder such that only while said tape recorder is in the reproduction or recording operating mode, said engaging portion of said operating member is positioned on the locus of rotation of said engaging portion of said rotary member when the urging force of said detecting member disappears, and when said tape recorder is in any other operating mode, said engaging portion of said operating member is positioned at a non-engageable position spaced away from the locus of rotation of said engaging portion of said rotary member.

Accordingly, when the tape recorder is in the reproduction or recording operating mode, while the reel receiving member is rotating, engagement between the engaging portion of the rotary member and the engaging portion of the operating member is prevented by the urging force produced at the detecting member by rotation of the reel receiving member. However, if the reel receiving member is stopped so that the urging force of the detecting member disappears, the engaging portion of the rotary member is engaged with the engaging portion of the operating member to operate the operating member thereby to activate a particular mechanism of the tape recorder such as an automatic stopping mechanism or an automatic reversing mechanism.

To the contrary, when the tape recorder is in any other operating mode than the reproduction or recording operating mode, for example, in an operating mode of FF (fast feeding), rewinding, or pause (except a stopping condition), the operating member is positioned at its non-engageable position. Accordingly, not only during rotation of the reel receiving member but also when the reel receiving member is stopped at an end of a tape, no engagement between the engaging portion of said rotary member and the engaging portion of said operating member is established.

The above and other objects, features and advantages of the present invention will become apparent from the following description and the appended claims, taken in conjunction with the accompanying drawing.

BRIEF DESCRIPTION OF THE DRAWINGS

FIG. 6 is a partial plan view of a tape recorder illustrating another embodiment of the invention;

FIG. 7 is a partial plan view showing a further embodiment of the invention;

FIG. 8 is a partial plan view showing a yet another embodiment of the invention; and FIG. 9 is a partial plan view showing a still further embodiment of the invention.

DESCRIPTION OF THE PREFERRED EMBODIMENTS

Now, preferred embodiments of the present invention will be described with reference to the accompanying drawings.

Figure 1:
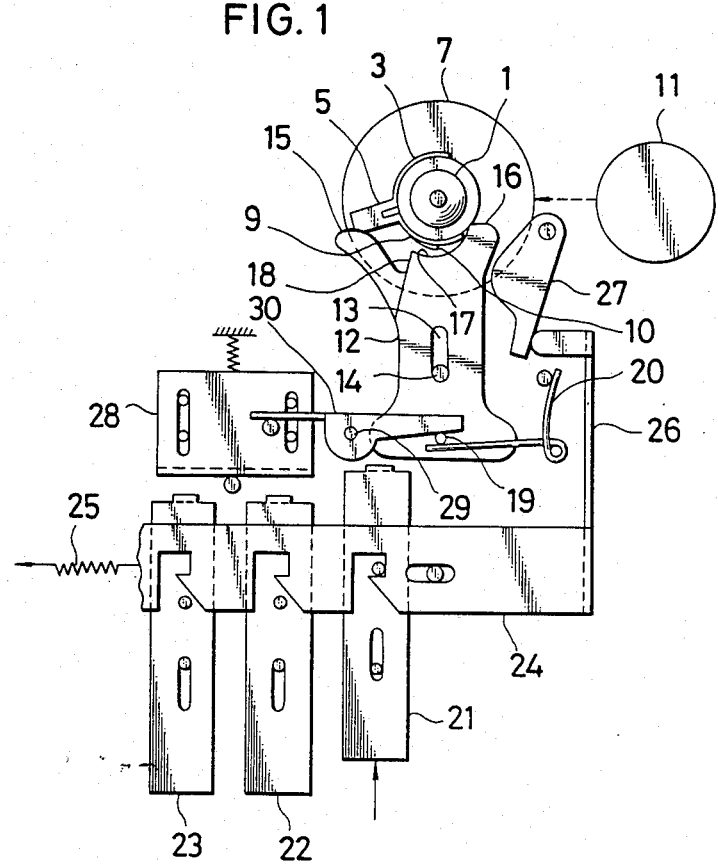
FIG. 1 is a partial plan view of a tape recorder illustrating a preferred embodiment of the present invention.
Figure 2:
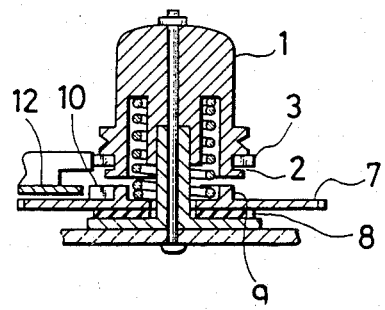
FIG. 2 is a vertical sectional view, in an enlarged scaled, of a reel receiving member and its associated parts of the tape recorder of FIG. 1.

Referring first to FIGS. 1 to 5, there is shown a tape recorder according to a first embodiment of the present invention. The tape recorder shown includes a reel receiving member 1 adapted to receive a reel hub of a tape cassette thereon. The reel receiving member 1 has an annular groove 2 formed on an outer periphery of a lower portion thereof as shown in FIG. 2. A detecting member 3 is fitted in the annular groove 2 of the reel receiving member 1.

Figure 3:
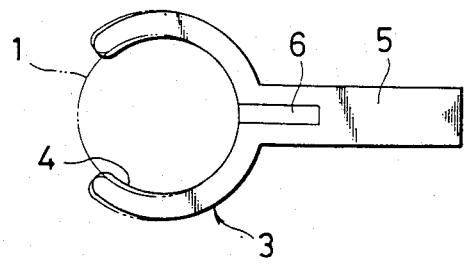
FIG. 3 is a plan view, in a somewhat enlarged scale, of a detecting member of the tape recorder of FIG. 1.

The detecting member 3 is made of a synthetic resin material and has a substantially C-shaped fitting portion 4 and a pressing portion 5 extending outwardly from the center of the fitting portion 4 and having a slit 6 formed therein which extends outwardly from an inner periphery of the fitting portion 4 as shown in FIG. 3. The inner periphery of the fitting portion 4 of the detecting member 3 has an inner diameter somewhat smaller diameter than the outer diameter of the bottom of the annular groove 2 of the reel receiving member 1, and the distance between opposite ends of the fitting portion 4 is further smaller than the outer diameter of the bottom of the annular groove 2 so that the fitting portion 4 of the detecting member 3 may partially embrace the reel receiving member 1. In order to allow the bottom of the annular groove 2 of the reel receiving member 1 to be fitted in the inner periphery of the fitting portion 4 of the detecting member 3 and in order to produce a suitable contacting pressure of the fitting portion 4 to the reel receiving member 1, the fitting portion 4 is provided with suitable resiliency. Accordingly, in assembling the detecting member 3 to the reel receiving member 1, the former will be forced axially toward the latter with the opposite ends of the fitting portion 4 of the former received in the annular groove 2 of the latter whereupon opposite end portions of the fitting portion 4 will be first yielded away from each other by the reel receiving member 1 and then allowed to embrace the reel receiving member 1 with its entire inner periphery under a suitable contacting force provided by the resiliency of the fitting portion 4. The slit 6 in the pressing portion 5 of the detecting member 3 contributes to production of such resiliency of the fitting portion 4, but where the fitting portion 4 has such suitable resiliency, the slit 6 is not necessary and can be omitted.

A rotary member 7 in the form of a gear wheel is mounted in a coaxial relationship with the reel receiving member 1. Rotation of the rotary member 7 is transmitted to the reel receiving member 1 by way of a friction member 8 such as a friction member made of felt.

Figure 4:
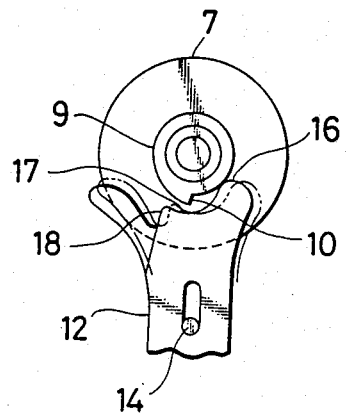
FIG. 4 is a plan view showing a relation between an operating member and a cam face of a rotary member of the tape recorder of FIG. 1.

The rotary member 7 has a cam face 9 formed on an upper surface thereof and surrounding the center of rotation thereof as shown in FIG. 4. The cam face 9 of the rotary member 7 has a substantially spiral shape and defines, at an end thereof at which it has a maximum radius, a shoulder which serves as an engaging portion 10. The rotary member 7 is connected to be driven to rotate by a motor 11. An end of an operating member 12 in the form of a plate is located above the rotary member 7.

The operating member 12 has an elongated hole 13 formed at a location near the center of gravity thereof and is mounted for back and forth and pivotal movement along and around a fixed pin 14 erected on a tape recorder base plate. The operating member 12 has, at the end thereof above the rotary member 7, a pressure receiving portion 15 located for abutting engagement by the pressing portion 5 of the detecting member 3, an abutting portion 16 for abutting engagement with the cam face 9 of the rotary member 7, a slidably contacting face 17 contiguous to the abutting portion 16, and an engaging portion 18 contiguous to the slidably contacting face 17. The operating member 12 further has an engaging pin 19 formed projectingly at the other end thereof.

The engaging pin 19 is engaged by an end portion of a torsion spring 20 so that the operating member 12 is normally urged in a forward direction. Thus, when the operating member 12 is at a position pushed by the spring 20, the pressure receiving portion 15 of the operating member 12 is continuously pressed by the pressing portion 5 of the detecting member 3 due to a turning force of the detecting member 3 in a counterclockwise direction in FIG. 1 as and while the reel receiving member 1 rotates in the counterclockwise direction. Accordingly, the operating member 12 is pivoted in a counterclockwise direction in FIG. 1 until the abutting portion 16 thereof abuts with the cam face 9 of the rotary member 7. Meanwhile, when the engaging portion 10 of the rotary member 7 is slidably engaged with the slidably contacting face 17 and then presses against the abutting portion 16 of the operating member 12, the engaging portion 18 of the operating member 12 is located on a locus of rotation of the engaging portion 10 as shown in phantom in FIG. 4. However, after the engaging portion 10 passes the abutting portion 16, the operating member 12 is pivoted in the counterclockwise direction in FIG. 4 until the abutting portion 16 thereof is slidably contacted with the cam face 9 of the rotary member 7 again to move the engaging portion 18 thereof out of the locus of rotation of the engaging portion 10 of the rotary member 7. Accordingly, so far as the reel receiving member 1 is rotating, engagement of the engaging portion 10 of the rotary member 7 with the engaging portion portion 18 of the operation member 12 will not occur.

The tape recorder further includes a reproduction operating member 21, a fast feeding operating member 22 and a rewinding operating member 23, and an arresting plate 24 for selectively holding one of the operating members 21, 22, 23 to its pushed in position (actuated position). The arresting plate 24 is normally urged in a direction to arrest an actuated one of the operating members 21, 22, 23 to its actuated position by means of a spring 25, but when a stopping operating member not shown is pushed in to its actuated position, it is moved in the opposite direction thereby to release the actuated operating member from its arrested actuated position. The arresting plate 24 has an extension 26. A pivotal member 27 is located near the rotary member 7 and interposed between the extension 26 of the arresting plate 24 and the abutting portion 16 of the operating member 12. Thus, when the operating member 12 is pivoted over a relatively large angular range in the clockwise direction in FIG. 1, the abutting portion 16 thereof will engage with and pivot the pivotal member 27 which in turn will press against the extension 26 of the arresting plate 24 to move the arresting plate 24 in the direction opposite to the direction of the urging of the spring 25, that is, in the direction to release an arrested one of the operating members 21, 22, 23 from its arrested actuated position.

The tape recorder further includes a movable member 28 in the form of a plate which is pushed to move forwardly when one of the fast feeding operating member 22 and the rewinding operating member 23 is pushed in. The movable member 28 normally engages with an end of a connecting member 30 which is mounted for pivotal motion around a shaft 29. The other end of the connecting member 30 opposes to the engaging pin 19 on the operating member 12 from the side opposite to the spring 20.

Figure 5:
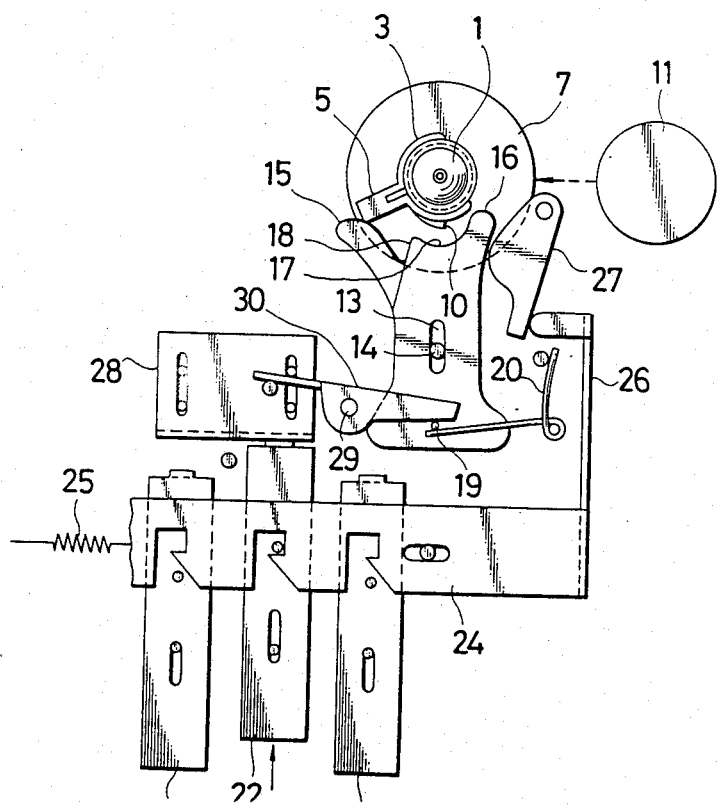
FIG. 5 is a view similar to FIG. 1 but illustrating the tape recorder in a fast feeding operating condition.

Thus, when the fast feeding operating member 22 or the rewinding operating member 23 is selectively pushed in, the movable member 28 is pushed thereby to move forwardly to pivot the connecting member 30 to move the operating member 12 back to its non-engageable position as shown in FIG. 5.

In this position, the engaging portion 18 of the operating member 12 is spaced far away from the locus of rotation of the engaging portion 10 of the rotary member 7. Consequently, whatever pivoted position the operating member 12 assumes, engagement of the engaging portion 10 of the rotary member 7 with the engaging portion 18 of the operating member 12 will occur no more.

Accordingly, with the construction described above, when the tape recorder is in the reproduction or recording operating mode, engagement of the engaging portion 10 of the rotary member 7 with the engaging portion 18 of the operating member 12 is prevented by a turning force of the detecting member 3 produced by rotation of the reel receiving member 1 while the reel receiving member 1 is rotating. To the contrary, if the reel receiving member 1 is stopped so that the turning force of the detecting member 3 disappears, then the engaging portion 10 is engaged with the engaging portion 18 to pivot the operating member 12 to a relatively large extent in the clockwise direction in FIG. 1 thereby to move, via the pivotal member 27, the arresting plate 24 to its arrest releasing direction to allow the reproduction operating member 21 to return from its actuated position to its home or non-actuated position. Consequently, the tape recorder is returned to its stopping condition.

To the contrary, in any other operation mode of the tape recorder than the reproduction or recording operating mode, for example, when the fast feeding operating member 22 is pushed in to bring the tape recorder into the FF (fast feeding) operating mode or when the rewinding operating member 23 is pushed in to bring the tape recorder into the rewinding operating mode, the operating member 12 is retracted to its nonengageable position as shown in FIG. 5. As a result, whether the reel receiving member 1 is rotating or is stopped at an end of a tape, the engaging portion 10 of the rotary member 7 is not at all engaged with the engaging portion 18 of the operating member 12.

Accordingly, in any other operating mode than the reproduction or recording operating mode, presence of the operating member 12 will have no bad influence on running of a tape. This will facilitate designing of a tape recorder and will contribute to reduction of its cost.

Meanwhile, the rotary member 7 has the cam face 9 for abutting engagement with the abutting portion 16 of the operating member 12 while the operating member 12 has, contiguously to the abutting portion 16, the slidably contacting face 17 for slidably contacting with the engaging portion 10 of the rotary member 7. Accordingly, while the engaging portion 10 is slidably contacted with the slidably contacting face 17 and then with the abutting portion 16 of the operating member 12, the abutting portion 16 is spaced away from the cam face 9, but when the engaging portion 10 is disengaged from the abutting portion 16, now the abutting portion 16 is slidably contacted with the cam face 9. Accordingly, no colliding noises will be produced when the engaging portion 10 is engaged with and disengaged from the abutting portion 10 each time the rotary member 7 makes one complete rotation.

Further, since the operating member 12 is supported at a portion near the center of gravity thereof by the fixed pin 14, in what posture the tape recorder is used, little displacement of the operating member 12 due to its own weight will appear. Accordingly, no operation in error will occur from such possible displacement of the operating member 12.

It is to be noted while in the description of the embodiment given above the movable member 28 is moved forwardly to move the operating member 12 to its nonengageable position by a pushing in operation of the fast feeding or rewinding operating member 22 or 23, an alternative arrangement is also allowable wherein the operating member 12 is held to its non-engageable position by the reproduction or recording operating member when the reproduction or recording operating member is at its inoperative position and is moved forwardly from its non-engageable position by a pushing in operating of the reproduction or recording operating member.

Further, the movable member may be any member only if it has different positions for the reproduction or recording operating mode and for any other operating mode. For example, it is possible to employ, for the movable member, a pinch roller support member on which a pinch roller is supported. Such an arrangement is illustrated in FIG. 6.

Referring to FIG. 6, a pinch roller 32 is supported on a pinch roller support member 31. The member 31 is located such that it presses the pinch roller 32 thereon against a capstan 33 when the tape recorder is in the reproduction or recording operating mode, but when the tape recorder is in any other operating mode, the member 31 assumes another position in which the pinch roller 32 thereon is spaced away from the capstan 33. The pinch roller support member 31 is associated with the operating member 12 as in the embodiment of FIG. 6. Accordingly, similar effects to those of the preceding embodiment will be obtained.

In the meantime, while in the preceding embodiments the rotary member is located in a coaxial relationship with the reel receiving member 1, it may otherwise be possible to make use of a turning force of another rotary member 34 as shown in FIG. 7 which cooperates (for example, meshes) with the rotary member 7 coaxial with the reel receiving member 1 in order to operate an operating member 35 which corresponds to the operating member 12.

Further, the detecting member is not necessarily provided in a coaxial relationship with the reel receiving member 1 as in the preceding embodiments, either.

FIG. 8 shows a modified arrangement wherein a detecting member 36 has an axis of rotation displaced or offset from that of the reel receiving member 1. In the arrangement, the detecting member 36 contacts with the reel receiving member 1 so that a turning force of the reel receiving member 1 is applied to pivot the detecting member 36 in one direction. As a modification of the arrangement, a detecting member which is designed to make a non-arcuate reciprocating motion such as a linear reciprocating motion may possibly be employed.

Further, as shown in FIG. 9, a detecting member 3 similar to the detecting member 3 of FIG. 3 may be provided in a coaxial relationship with a rotary member 37 which is rotated and stopped in synchronism with the reel receiving member 1 and with which the detecting member 3 is contacted to obtain a pressing force of the detecting member 3 against the operating member 12.

As apparent from the foregoing description, according to the present invention, a tape recorder can be provided wherein stopping of a reel receiving member when a tape recorder is in a reproduction of recording operating mode is detected assuredly to activate a particular mechanism without increasing the contacting pressure of a pinch roller to a capstan and without deteriorating the stability of running of a tape.

Having now fully described the invention, it will be apparent to one of ordinary skill in the art that many changes and modifications can be made thereto without departing from the spirit and scope of the invention as set forth herein.

What is claimed is:

1. In a tape recorder of the type which includes a reel receiving member, a rotary member connected to be driven to rotate by a motor by way of frictional motion transmitting means for transmitting motion to said reel receiving member and having an engaging portion thereon, a detecting member normally held in contact with said reel receiving member or a rotatable member which is rotated and stopped in synchronism with said reel receiving member such that said detecting member may be urged in a predetermined direction by an urging force caused by a turning force of said reel receiving member or said rotatable member, and an operating member located near said rotary member end having an engaging portion thereon, whereby while said reel receiving member is rotating, said operating member is continuously urged in a predetermined direction by the urging force produced at said detecting member thereby to prevent engagement between said engaging portion of said rotary member end said engaging portion of said operating member, but when the urging force of said detecting member disappears, said engaging portion of said rotary member is engaged with said engaging portion of said operating member to operate said operating member thereby to activate a particular mechanism of said tape recorder, the improvement wherein said rotary member further has a continuous smooth cam face extending around the center of rotation thereof from a radially outermost end of said engaging portion to a radially innermost end of said engaging portion, while said operating member further has an abutting portion for abutting engagement with said cam face of said rotary member, and a slidebly contacting face contiguous to said abutting portion thereof end located such that when said engaging portion of said rotary member is slidably contacted with said slidably contacting face of said operating member, said engaging portion of said operating member is positioned on a locus of rotation of said engaging portion of said rotary member, end wherein said operating member is associated with a movable member which has different positions for a reproduction or recording operating mode and for any other operating mode of said tape recorder such that only while said tape recorder is in the reproduction or recording operating mode, said engaging portion of said operating member is positioned on the locus of rotation of said engaging portion of said rotary member when the urging force of said detecting member disappears, and when said tape recorder is in any other operating mode, said engaging portion of said operating member is positioned at a non-engageable position spaced away from the locus of rotation of said engaging portion of said rotary member, end wherein said rotary member is mounted in a coaxial relationship with said reel receiving member.

2. A tape recorder according to claim 1, wherein said movable member is a reproduction or recording operating member.

3. A tape recorder according to claim 1, wherein said movable member is a pinch roller support member on which a pinch roller is supported.

4. A tape recorder according to claim 1, wherein said detecting member is mounted in a coaxial relationship with said reel receiving member.

5. A tape recorder of the type which includes a reel receiving member, a rotary member connected to be driven to rotate by a motor by way of frictional motion transmitting means for transmitting motion to said reel receiving member and having an engaging portion thereon, a detecting memeber normally held in contact with said reel receiving member or a rotatable member which is rotated and stopped in synchronism with saud reel receiving member such that said detecting member may be urged in a predetermined direction by an urging force caused by a turning force of said reel receiving member or said rotatable member, and an operating member located near said rotary member and haying an engaging portion thereon, whereby while said reel receiving member is rotating, said operating member is continuously urged in a predetermined direction by the urging force produced at said detecting member thereby to prevent engagement between said engaging portion of said rotary member and said engaging portion of said operating member, but when the urging force of said detecting member disappears, said engaging portion of said rotary member is engaged with said engaging portion of said operating member to operate said operating member thereby to activate a particular mechanism of said tape recorder, the improvement wherein said rotary member further has a continuous smooth cam face extending around the center of rotation thereof from a radially outermost end of said engaging portion to a radially innermost end of said engaging portion, while said operating member further has an abutting portion for abutting engagement with said cam face of said rotary member, and a slidably contacting face contiguous to said abutting portion thereof and located such that when said engaging portion of said rotary member is slidably contacted with said slidably contacting face of said operating member, said engaging portion of said operating member is positioned on a locus of rotation of said engaging portion of said rotary member, and wherein said operating member is associated with a moveable member which has different positions for a reproduction or recording operating mode and for any other operating mode of said tape recorder such that only while said tape recorder is in the reproduction or recording operating mode, said engaging portion of said operating member is positioned on the locus of rotation of said engaging portion of said rotary member when the urging force of said detecting member disappears, and when said tape recorder is in any other operating mode, said engaging portion of said operating member is positioned at a non-engageable position spaced away from the locus of rotation of said engaging portion of said rotary member, and wherein said detecting member has an axis of rotation displaced from an axis of rotation of said reel receiving member.

6. A tape recorder according to claim 5, wherein said detecting member is formed as a member which makes a non-arcuate reciprocating motion.

7. A tape recorder according to claim 5, wherein said detecting member is contacted with a rotatable member which is rotated and stopped in synchronism with said receiving member.

8. A tape recorder according to claim 5, wherein said operating member is supported at a portion near the center of gravity thereof on a tape recorder base plate.

* * * * *